Matthias W. Baldwin 6-29-1833
Wheels for Locomotives and Railroad Cars.
CLASSIFICATION
7611-4
DIVISION.
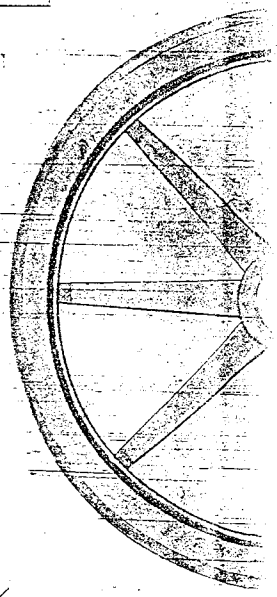
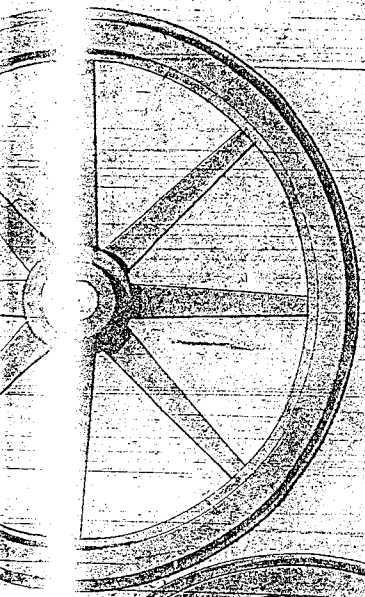
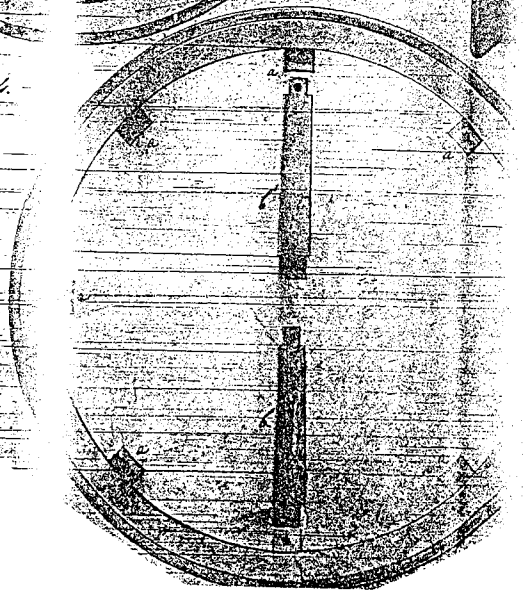
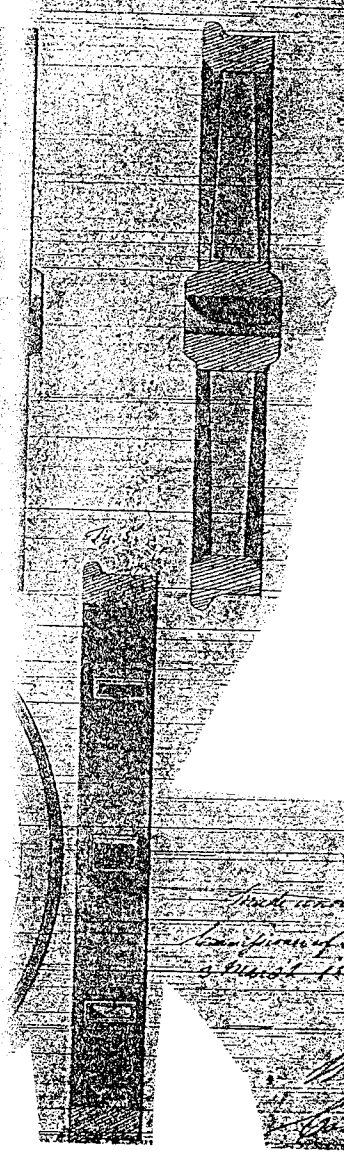
Fig. 1. Wheel cast of hardened iron.
Fig. 2. Side view.
Fig. 3. Section.
Fig. 4. Rim of hardened iron.
a a a a a segments
b. Spokes of wood
b'. Spoke of iron or other metal.
5. Section of rim.

7611X June 29. 1833

Matthias W Baldwin of Philadelphia

Letters Patent

The Schedule referred to in these Letters Patent and making part of the same containing a description in the words of the said Matthias W Baldwin himself of his improvement in the manufacture of wheels for Locomotive Engines and Cars to run upon Rail Roads.

---

To all whom it may concern, Be it Known, that I Matthias W Balwin of the City of Philadelphia, have invented a new and useful manufacture of wheels for Locomotive Engines and Cars to run upon rail roads. and that the following is a full and exact description of my said Invention.

Instead of making the wheels for the carriages of Locomotive Engines and of other cars or carriages to be used upon rail roads of cast iron or of a combination of cast and wrought iron, or of wood combined with cast or wrought iron or with both as they have been heretofore made, I cast the rims of such wheels as well in most instances as the spokes and hubs or naves in one piece with the rims of a composition of metal known to workmen under the name of hardened brass or gun metal. It is not necessary for me to designate the proportions in which the respective metals are mixed, which form the hardened brass, or gun metal. as these will vary with the degree of hardness desired in the rim or tread of the wheel in a manner well known to those conversant with the casting of brass and its compounds.

Where it is desirable to increase the adhesion between the rail and the wheel it may be found necessary to make the wheels proportionally softer by decreasing the quantity of tin entering into the composition of them or even to cast them of soft brass or copper entirely. I do not intend to confine myself to any particular

7611X lar form of the tread of the wheel of the spokes and hubs but to
modify it in such way as experience may suggest to be the best
adapted to the particular carriage ~~to the particular carriage~~ or
Road to which the wheel is to be applied. I intend sometimes
also to cast the rim of the wheel of such metal without spokes
but furnished with such flanches logments or projections
as shall enable me to attach thereto spokes of wood iron or
other material. My claim to an exclusive privilege
I rest entirely upon a new manufacture of such wheels by
substituting for their rims or for every part of them a new
material as herein before set forth. the utility of which consists
in its being better adapted to the purpose which they are inten
ded to answer in running upon rail roads.

Witnesses
Jacob Keyser
A Pettit

Matthias W. Baldwin.

[illegible]
(Patented 29 June 1833)
THI (529 [illegible])